Figure 1:
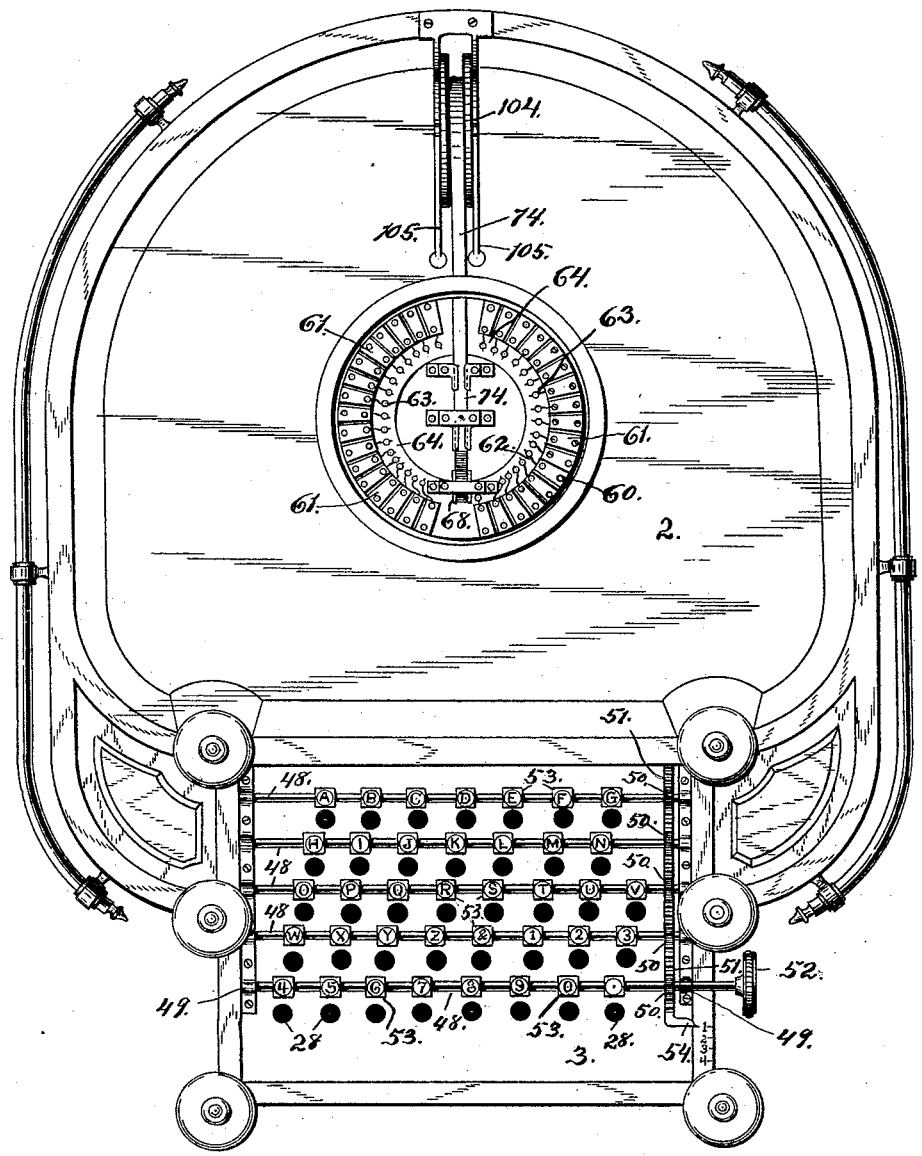

(No Model.)  C. V. BOUGHTON.  8 Sheets—Sheet 1.
SIGNAL TELEGRAPH.

No. 523,617.  Patented July 24, 1894.

(No Model.) C. V. BOUGHTON. 8 Sheets—Sheet 3.
SIGNAL TELEGRAPH.

No. 523,617. Patented July 24, 1894.

(No Model.) 8 Sheets—Sheet 4.

C. V. BOUGHTON.
SIGNAL TELEGRAPH.

No. 523,617. Patented July 24, 1894.

Witnesses:
G. M. Anderson
J. H. Murphy

Inventor
Claudius V. Boughton
By Miller and Hoddick
Attorneys.

(No Model.)  8 Sheets—Sheet 5.

C. V. BOUGHTON.
SIGNAL TELEGRAPH.

No. 523,617.  Patented July 24, 1894.

Witnesses.
G. M. Anderson
J. H. Murphy

Inventor
Claudius V. Boughton.
By Miller and Reddick
Attorneys.

(No Model.) 8 Sheets—Sheet 6.

C. V. BOUGHTON.
SIGNAL TELEGRAPH.

No. 523,617. Patented July 24, 1894.

Witnesses:
G. M. Anderson
J. H. Murphy

Inventor
Claudius V. Boughton.
By Miller and Hoddick.
Attorneys.

(No Model.) 8 Sheets—Sheet 7.

C. V. BOUGHTON.
SIGNAL TELEGRAPH.

No. 523,617. Patented July 24, 1894.

Witnesses:
G. M. Anderson
J. H. Murphy

Inventor
Claudius V. Boughton
By Miller & Hoddick
Attorneys.

(No Model.) C. V. BOUGHTON. 8 Sheets—Sheet 8.
SIGNAL TELEGRAPH.
No. 523,617. Patented July 24, 1894.

UNITED STATES PATENT OFFICE.

CLAUDIUS V. BOUGHTON, OF BUFFALO, NEW YORK, ASSIGNOR TO THE BOUGHTON TELEPHOTOS COMPANY, OF SAME PLACE.

SIGNAL-TELEGRAPH.

SPECIFICATION forming part of Letters Patent No. 523,617, dated July 24, 1894.

Application filed November 13, 1893. Serial No. 490,824. (No model.)

*To all whom it may concern:*

Be it known that I, CLAUDIUS V. BOUGHTON, a citizen of the United States, residing at Buffalo, in the county of Erie and State of New York, have invented certain new and useful Improvements in Signal-Telegraphs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in signal telegraphy of that particular class for which Letters Patent No. 482,780 were granted to me on the 20th day of September, 1892. That invention consisted essentially of a number of electric lamps arranged in a continuous line and a number of keys arranged upon a board. Each key being designated by a letter of the alphabet or a numeral and electrically connected with the necessary lamps to form the dots and dashes called for by the letter or numeral of the key in operation.

The object of my present invention is to perfect and add to a particular construction and arrangement of operative parts which connect the keys with the lamps and which forms the subject matter of a separate application filed by me on the 26th day of November, 1892, and serially numbered 453,178.

Such construction consists essentially of a number of electric lamps arranged in a continuous line, a bed-plate of non-conducting material, a series of metal strips insulated from each other in such bed-plate and each electrically connected with a separate lamp and contacting plates each operated by a separate key to complete the circuits through different groups of the metal strips to light the lamps necessary to produce the character desired.

My invention therefore consists, first, in an improved arrangement, within the casing, of the wires which connect the lamps with the insulated metal strips in the bed-plate, whereby their alternatingly projecting ends on each side of the bed-plate are connected with the lamps in the staff, with special reference to economy of space and accessibility in repairing accidental disarrangement or breakage of parts. Second. In combining with the keys and their operative attachments, a printing mechanism which automatically and simultaneously records each letter or numeral displayed upon the staff of lamps. Third. In special mechanism combined with the keys and their operative attachments for automatically and simultaneously feeding the ink-ribbon and the tape upon which is recorded the letter or numeral displayed upon the staff of lamps and for operating the tape-receiving reel. Fourth. In a special device in connection with the keys, by means of which the position of the different letters and numerals may be changed with relation to the keys to effect different ciphers in the characters shown upon the staff of lamps, and fifth, in the details of construction of the different parts hereinbefore outlined all of which will be more fully hereinafter described and claimed.

Figure 2:
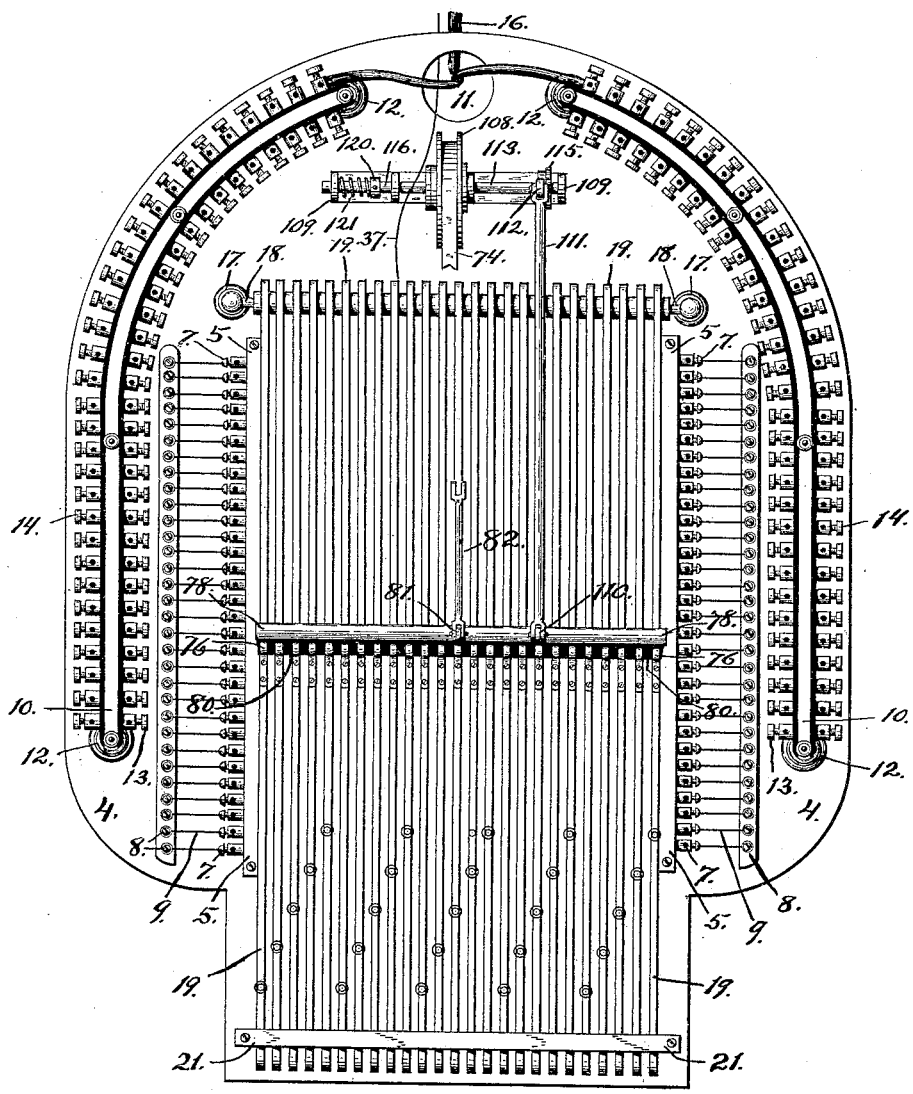
Figure 3:
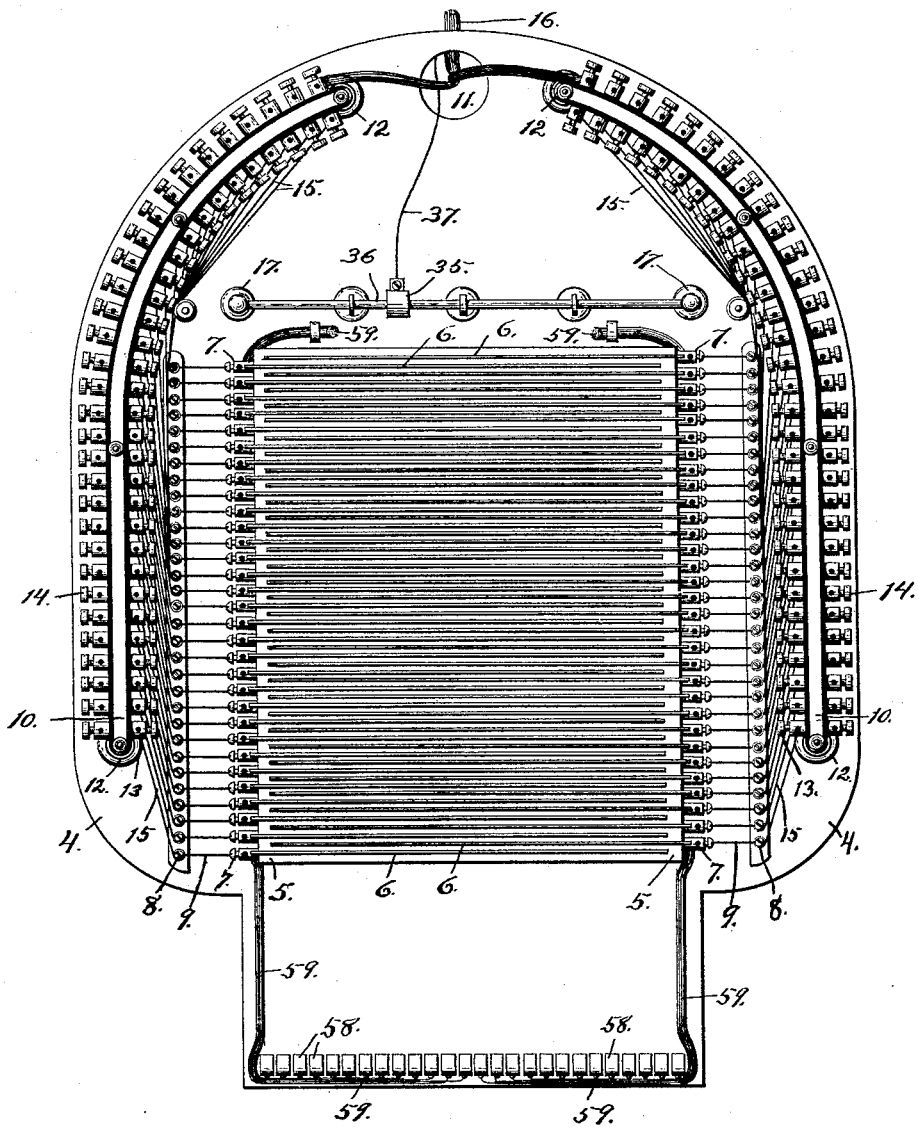
Figure 4:
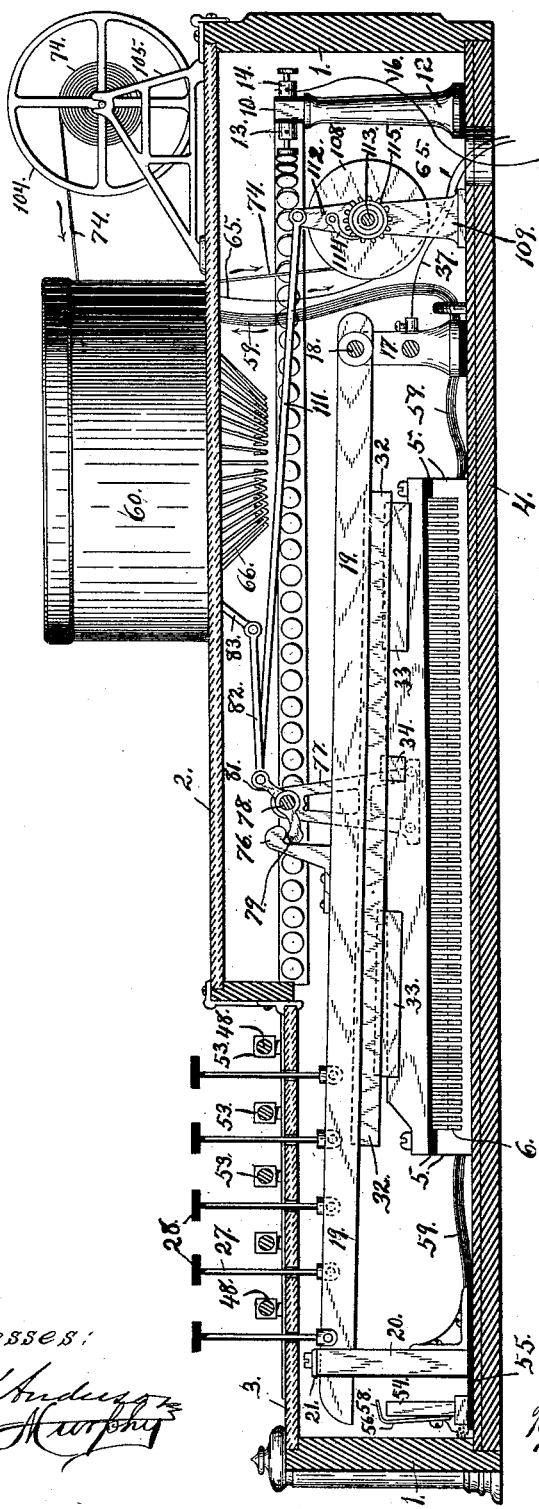
Figure 5:
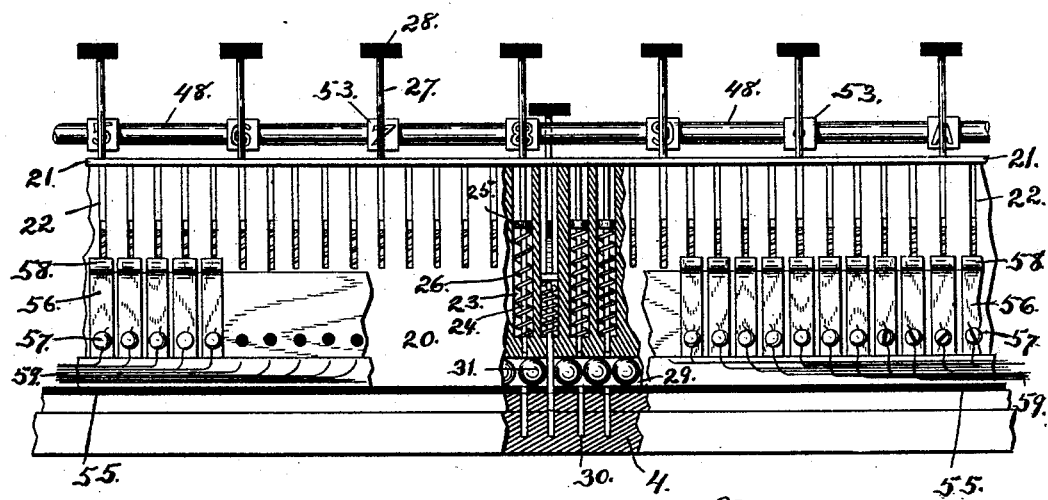
Figure 6:
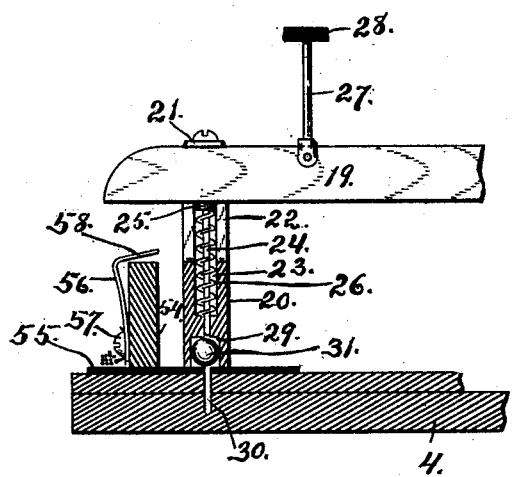
Figures 7, 8:
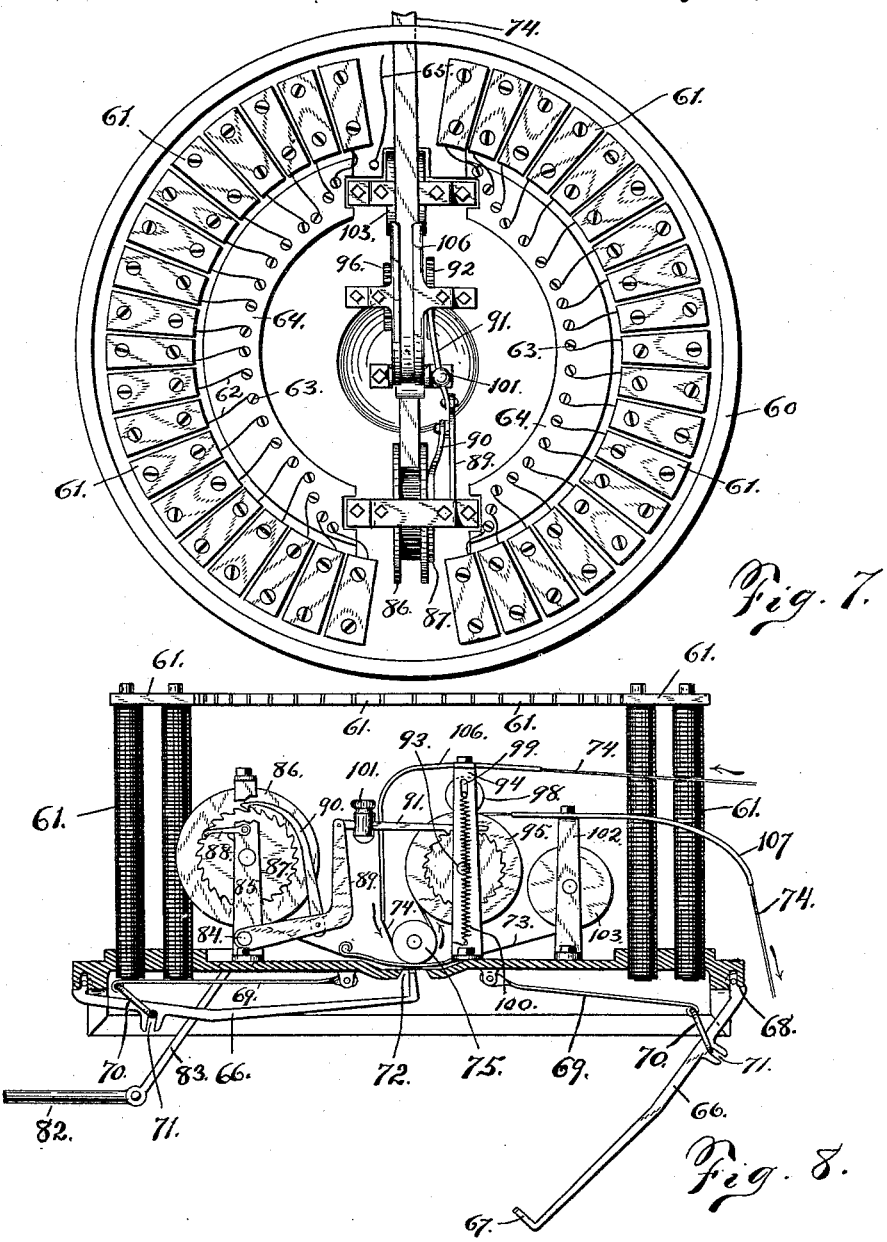
Figure 9:
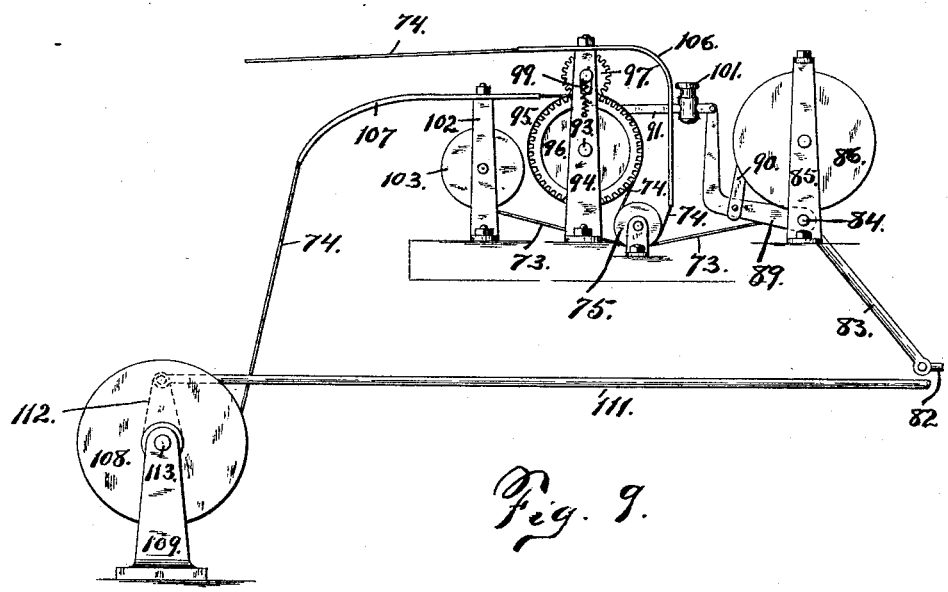
Figure 10:
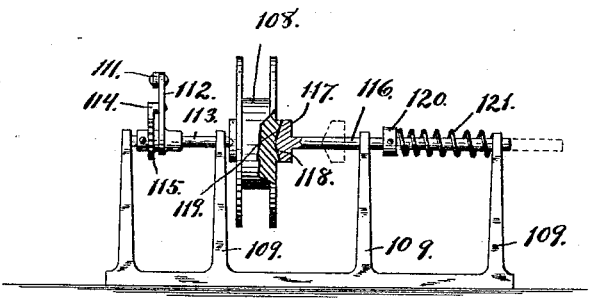
Figure 11:
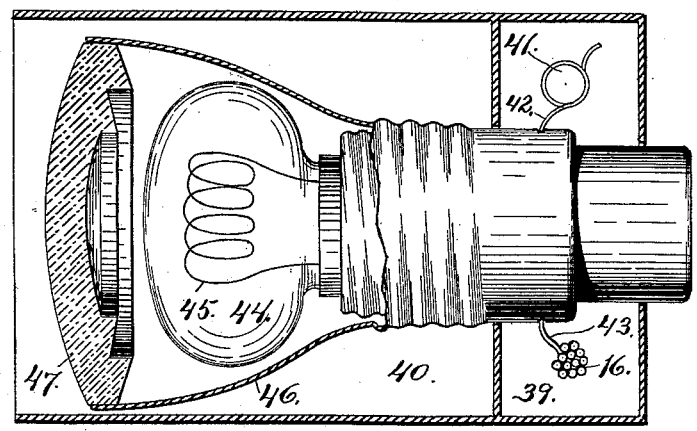
Figure 12:
Figure 13:
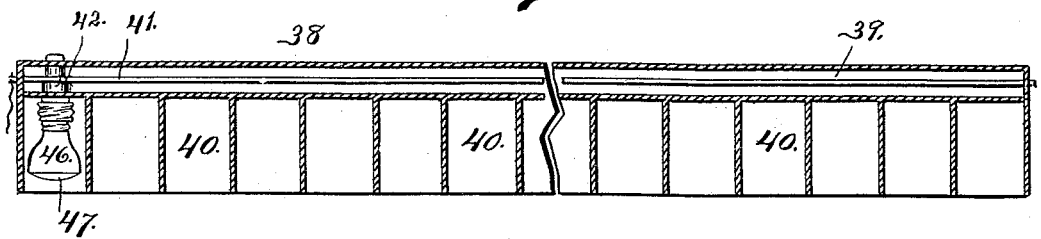

In the drawings, Figure 1 is a top plan view of the casing showing the key-board automatic printing mechanism and tape-reel. Fig. 2 is a top plan view of the same with the casing removed showing interior arrangement of wires and levers. Fig. 3 is a top plan view of Fig. 2 with the levers removed showing interior arrangement of wires and bed-plate with metal strip insulated therein. Fig. 4 is a vertical longitudinal section of the casing showing interior arrangement of operative parts. Fig. 5 is an enlarged front elevation of the same with casing removed and portions broken away. Fig. 6 is an enlarged detached detail view showing connection of one of the levers with the printing mechanism. Fig. 7 is a detached top plan view of the printing mechanism complete and inclosed in its casing. Fig. 8 is a vertical section of the printing mechanism complete without the casing. Fig. 9 is a detached detail view of the ink-ribbon and tape feeding mechanism and tape-receiving reel on the side opposite to that shown in Fig. 8. Fig. 10 is a front elevation of the tape-receiving reel shown in Fig. 9. Fig. 11 is an enlarged side elevation of one of the electric lamps and its reflector and lens. Fig. 12 is a front view of the staff of lamps, and Fig. 13 is a side sectional view of the same.

Referring to the drawings it will be seen that the operative parts are assembled in a casing of suitable configuration of which 1 is the side wall preferably of wood, 2 the main cover and 3 the cover for the key-board both of which are preferably of heavy plate-glass and 4 is the base-plate the upper face of which is formed of aluminum owing to its lightness, with a layer of wood secured to its under surface. Centrally arranged upon the base-plate 4 and nearer its front end, is the rectangular bed-plate 5 formed of any non-conducting material preferably of hard rubber. In grooves in this bed-plate 5 are loosely set at regular intervals apart and in a transverse direction the parallel spring-pressed metal strips 6, see Fig. 3. Every alternate strip on one side of the bed-plate 5 extends slightly beyond the same and has its projecting end provided with a binding post 7. The other set of alternate strips project beyond the opposite side of the bed-plate 5 and are likewise provided with similar binding posts 7. The alternating inner ends of these strips do not reach quite to the outer side edges of the bed-plate 5. In this manner they are entirely insulated one from the other. On either side of the bed-plate at a short distance therefrom are the two parallel rows of binding-posts 8. 8. corresponding in number to the binding posts 7 and connected therewith by the short metallic wires 9 so as to permit of the slight vertical play of the spring-pressed strips 16.

Arranged on either side of the base-plate 4 and just outside of the row of binding-posts 8. 8. midway between them and the side edges of the base plate are the strips 10, 10, preferably of wood, which curve inwardly at their rear ends parallel with the edge of the base-plate to points near the opening 11 in the base-plate. These strips 10. 10 are raised above the base-plate 4, being rigidly secured to standards 12. Their inner and outer edges are covered with a layer of hard rubber.

Short metallic posts corresponding in number to the binding posts 8 are fixed horizontally through the elevated strips 10. 10 their projecting ends on either side forming the inner rows 13 and outer rows 14 of binding-posts. The inner rows 13 of binding-posts are connected by wires 15 to the rows of binding posts 8 upon the base-plate 4 and wires secured in the two outer rows 14 of binding-posts are assembled from each side at the opening 11 and extend in the form of a cable 16 to the staff of lamps where they are separately connected in alternate order to the row of lamps in the staff. In this manner each successive metal strip 6 in the bed-plate 5 is connected with its corresponding successive lamp in the staff. The first metal strip 6 is connected at its left hand end as just described with the first lamp in the staff, the second strip 6 is connected at its right hand end in the same manner with the second lamp in the staff and so on to the last strip in the bed-plate 5. The strips are numbered in regular order from left to right the odd numbers 1, 3, 5, &c., appearing successively on the different set of binding-posts on the left side and the even numbers 2, 4, 6, &c., in the same manner on the right side. In this manner the path of the electric current from each numbered strip to its correspondingly numbered lamp is quickly traceable through the different binding posts bearing the same number and the individual wires connecting the same. Should any lamp in the staff fail to light therefore, the locating and repairing of the breakage or disarrangement of parts, becomes a very simple matter as the parts affected can not only be quickly found, but by reason of their systematic arrangement are easily accessible.

17. 17 are posts across which is secured a rod 18 upon which are pivoted a row of levers 19. The forward ends of these levers extend to the front of the casing and project a short distance through slots 22 in the wall 20 across the top of which is screwed the keeper 21. Under each lever 19 in the wall 20 are the vertical sockets 23 containing the pins 24 having heads 25 between which and the floor of the sockets 23 are confined the spiral springs 26 which force the heads 25 of the pins 24 up against the forward ends of the levers 19 holding them in contact with the keeper 21 until forced down. Each lever is provided with a hinged upright post 27 which extends up loosely through the cover and is provided at its upper end with a button 28 the whole forming spring pressed keys above the bed-plate. Each pin 24 is adapted to pass down through a horizontal recess 29 in the bottom of the wall 20 and into a socket 30 in the bed-plate. The recess 29 is filled loosely with metallic balls 31 which take up the length of the recess 29 with the exception of a narrow space sufficient to allow of the passage of one of the pins 24 down between two of the balls 31. With this arrangement only one key at a time can be depressed, as when the pin under the depressed key has been forced between two of the balls, the remaining balls in the recess are locked tightly together and prevent the downward passage of all the other pins and the ends of the levers which rest upon their heads. Consequently all the keys except the one in operation are securely locked, thus entirely preventing the descent of more than one key at the same time. Seated in the lower side of each of the levers 19 is a contacting plate 32 provided with downwardly projecting portions either long as at 33 or short as at 34 to represent dashes and dots and combinations of the same. These projections have uniform contact with the spring strips 6 in the bed-plate 5 with which they come in contact in the operation of the apparatus. A collar 35 upon the rod 36 between the posts 17. 17 is connected by the wire 37 with the lamps in the staff the source of the electric current being interposed between the collar 35 and the lamps. In this manner the operative parts just described are all electrically charged and the circuit is completed to light the lamps by the contact of the projections upon the levers with the metal strips in the bed plate.

In Figs. 12 and 13 I have shown views of my staff of lamps and in Fig 11 an enlarged view of the special construction of lamp preferably employed by me. The staff I make of sheet steel having the rear chamber 39 extending its entire length the remainder of the staff being subdivided into the narrow transverse chambers 40. In each of these chambers 40 I secure a lamp the shank of which extends across the long chamber 29. In this chamber is arranged a rod 41 to which the wire 37 is connected. One of the wires 42 of each lamp is connected with this rod, the other wire 43 of which passes into the cable 16 leading to the casing as shown in Figs. 2 and 3.

As seen in Fig. 11 the globe 44 of my lamp is preferably in the form of a door-knob, or slightly convex in front in order to provide room for the spiral filament 45 which emits a much more intense light than the loop-shaped filament the door-knob shape also shortens the length of the lamp thus permitting of a smaller and considerably lighter staff than would be required with the ordinary form of lamp. Surrounding the globe 44 is the parabolic reflector 46 having a highly polished interior surface and in its outer end is secured the lens 47 specially designed for paralleling and thus concentrating the rays of light from the lamp. In this manner I am enabled to greatly intensify the light given out by the filament and correspondingly increase the distance at which it can be seen both by night and day. These lamps are connected as before stated to the electric circuit and each lamp is separately connected through individual wires to its separate and distinct spring-strip 6.

Each light has a number corresponding to the several posts through which its individual wires pass to its separate and independent spring-strip 6 in the bed-plate 5.

The signals produced upon the staff of lights are in what are known as dots and dashes, in this instance two contiguous lights constituting a dot and twelve contiguous lights a dash with spaces intervening of twelve blank lights.

Each key representing the letters of the alphabet has attached to it through the intervening levers, a contacting plate with long or short projections, or both, representing the proper dashes and dots and each projection when the key is depressed comes in contact with a sufficient number of spring strips 6 to complete the various circuits and illuminate the lamps connected with the several strips touched. When the pressure upon the key is removed the spring 26 raises it and the contact is instantly broken extinguishing the lights. The contacting plate shown in Fig. 4 is attached to the key marked K and has one long one short and one long projection which touch when depressed first twelve strips then two and again twelve leaving twelve strips untouched between each two projections causing the lights connected with the touched strips to flash producing upon the staff a dash a dot and a dash with the necessary blank spaces between. With my improved form and arrangement of globe, spiral filament reflector and lens it is possible for me to omit every other lamp and produce equally good effects with a corresponding reduction in the cost and operation of the staff and instrument.

In Fig. 1 is shown an adjustable index frame consisting of the parallel revoluble rods 48 equal in number and adjacent to the rows of keys 28. The ends of these rods fit loosely in the bearings 49, and 50 are pinions keyed to the rods at one side of the frame. These pinions 50 intermesh with a common movable rack-bar 51 located underneath. One of the rods in this instance the forward one extends beyond the frame and has at its outer end the thumb-wheel 52. On turning this thumb wheel and with it the attached rod and its pinion the rack-bar is caused to move in either direction at the same time actuating the pinions on the other rods and in this manner the rods are all uniformly revolved in the same direction. Upon these rods, in positions adjacent to the keys 28 are the blocks 53, upon the four faces of which are placed letters and numerals as clearly shown in Fig. 1.

As they are placed in the drawings the keys opposite the several characters will produce upon the staff of lamps the proper dashes and dots called for by each letter or figure but if a cipher should be necessary it can quickly be effected by turning the thumb-wheel 52 sufficiently to effect a quarter revolution of the rods thus bringing the next adjacent face of each block 53 into view upon which the several characters are so arranged that the letter A is shifted to the next block upon which the letter B was before visible and so on through the alphabet and numerals, the period formerly shown at the right hand end of the forward rod being shifted to the left hand end of the rear rod where the letter A formerly appeared. When a message is flashed with the characters thus arranged the key which represented A will now, on being depressed flash a period upon the staff of lamps and so on through the several keys producing a cipher intelligible only to those acquainted with the shift. Another quarter revolution of the rods 48 in the same direction will produce a correspondingly different arrangement of the characters visible forming cipher number two. In this manner four different arrangements of characters can be employed of which the first is the correct position with relation to the keys and the other three are ciphers, the position of the pointed end 54 of the rack-bar 51 with respect to the numbers 1, 2, 3 and 4, indicating the particular arrangement in operation. An endless number of additional ciphers may be obtained by making the characters on the faces of the blocks removable and interchangeable.

For the purpose of keeping an exact record of all messages displayed upon the staff of lamps I have devised a special printing mechanism electrically connected to the keys and their operative attachments which automatically and simultaneously prints upon a tape each letter or numeral displayed upon the staff of lamps, the tape and ink-ribbon being moved as required by suitable feed mechanism also connected with and operated by the keys and their operative attachments. Arranged along the front wall 20 (see Figs. 5 and 6,) are a series of metallic posts 54 secured at their bases to the plate 55 of hard rubber which also extends underneath the wall 20 thus insulating the wall 20 and posts 54 from the base-plate 4. Secured to the front faces of the posts 54 are the spring strips 56 held in position by the screws 57. These strips 56 extend outwardly away from the posts their upper bent ends 58 extending at an angle over the tops of the posts as shown, for elastic contact with the outer ends of the levers 19 which extend out through the wall 20 and over the posts and their springs. To each of the spring strips 56 is attached a wire 59 secured by the screws 57. Upon the top plate 2 of the casing and centrally arranged thereon is the cylindrical box 60, within which are concentrically arranged a series of magnets 61 corresponding in number to the levers 19 and spring-strips 56. One of the poles of each magnet is connected by one of the wires 59 to a separate spring-strip 56 and the other pole of each of the magnets is connected by a separate wire 62 (see Fig. 7) to the binding screws 63 upon the concentric circular metallic plate 64 which with the magnets rest upon a non-conducting bed-plate. The plate 64 is electrically connected to the main circuit by the wire 65. Around the outer edge of the plate in which the magnets 61 rest and on its under side are pivoted a series of bars 66 similar to those employed in a type-writer. Their inner ends 67 being turned up at right angles thereto each end bearing a letter or numeral corresponding to the one marked on the magnet immediately above. A shoulder 68 at their pivoted ends prevents their falling lower than the position shown on the right side of Fig. 8 and also in Fig. 4. A series of metal strips or armatures 69 are radially pivoted to the under side of the bed-plate extending outwardly their outer ends embracing loosely the loops 70, the lower ends of these loops encircling the bars 66 and resting in the grooves 71 on the under sides of the bars 66. When the bars 66 are in their extreme lower position the armatures 69 are held in a position just below the magnets 61 and ready for action as clearly shown in Fig. 8.

When a certain key is depressed say the letter K (see Fig. 4), in order to flash upon the staff of lamps, a dash a dot and a dash which represents K in the telegraphic alphabet, the instant contact is made between the projecting portions 33, 33 and 34 upon the strip 32 carried by the lever 19 and the spring-pressed metal strips 6 lying immediately under the projecting portions, the forward end of the lever 19 comes in contact with the spring-strip 58 and the electric current passes down the strip and through its connecting wire 59 to the magnet 61 belonging to the letter K. This magnet becomes energized and draws its armature 69 into instant contact therewith. The quick upward movement of the armature lifts the bar 66 bearing the letter K upon its inner end, a certain distance, its acquired momentum completing its stroke and the letter which it carries is thrown up into the small opening 72 in the base-plate and against the ink-ribbon 73 and tape 74 which are fed under the elastic roller 75 just above the opening 72 as shown on the left side of Fig. 8. In this manner the letter corresponding to the character flashed upon the staff of lamps is automatically and simultaneously printed upon the tape by the same electric current which illuminates the lamps. When the spring pressed key is released the contact at the spring strip 58 is broken and the armature 69 being released, the letter-bar 66. 67 immediately falls by its own weight to its normal position as shown.

The ink ribbon 73 and tape 74 are mechanically fed as required by the downward movement of the key and its lever in the following manner. Centrally secured upon the upper edge of each lever 19 is the hook-shaped projection 76. In front of this row of projections 76 and mounted in standards 77 (see Fig. 4) is the rock-shaft 78 having the ledge 79 rigidly secured thereto and extending across its entire front side and just under the hook-shaped projections 76 upon the levers 19. A strip of hard rubber 80 is secured across the upper surface of the ledge 79 to insulate the hook-shaped projections from the ledge when they bear down upon the same. 81 is a rocker-arm centrally secured to the rock-shaft 78 on the opposite side to the ledge 79. To the upper end of this rocker-arm 81 is pivoted one end of the connecting rod 82, its other end being pivoted to the lower end of the rocker-arm 83 rigidly secured to the rock-shaft 84 mounted in the lower ends of standards 85 within the casing 60 upon the cover 2. Between these standards 85 is mounted the reel 86 around which one end of the ink-ribbon 73 is wound.

87 is a ratchet wheel rigidly mounted upon the same shaft with the reel 86 having the dog 88 engaging therewith.

89 is an angular rocker-arm rigidly secured to the rock-shaft 84. To the lower end of this rocker-arm is pivoted the curved pawl 90 which engages with the upper side of the ratchet-wheel 87. In the upper end of the angular rocker-arm 89 is pivoted the pawl 91 which engages with the ratchet wheel 92 rigidly mounted upon the shaft 93 journaled in the standards 94. The pawl 91 has the sliding weight 101 mounted thereon which serves to keep it in engagement with the ratchet wheel 92.

Upon the shaft 93 is rigidly mounted the drum 95 around which the tape 74 passes. On the side of the drum 95 opposite to the ratchet wheel 92, is the gear-wheel 96 rigidly secured to the shaft 93. This gear-wheel 96 intermeshes with the smaller gear-wheel 97 which is secured to the friction roller 98 loosely mounted in slots 99 in the standards 94. The roller 98 is pressed down upon the drum 95 by the spiral springs 100 located outside of the standards 94. Within the standards 102 is mounted the reel 103 from which the ink-ribbon 73 is unwound. The tape 74 is unwound from the outside reel 104 mounted in standards 105 secured to the cover 2 as shown in Figs. 1 and 4. It passes therefrom into the casing 60 and upon the curved guide 106 secured to the standards 94 which directs it to the elastic wheel 75 around which it is passed to the drum 95 and from thence to the curved guide 107 secured to the standards 102. From this guide it passes to the receiving reel 108 mounted in standards 109 secured to the bed-plate 4 within the main casing. This reel 108 is automatically operated by the keys as follows.

110, see Fig. 2, is a rocker arm rigidly secured to the rock-shaft 78. One end of the connecting rod 111 is pivoted to the rocker-arm 110 its other end being pivoted to lever 112 loosely mounted upon the shaft 113 which carries the reel 108. A pawl 114 pivoted upon one side of the lever 112 engages with the ratchet wheel 115 to turn the same and with it the reel 108. This reel engages removably with the shaft 113 and is held in operative position thereon by the spring-pressed keeper consisting of the rod 116 loosely mounted in two of the standards having the enlarged head 117 with beveled face 118 fitting into a correspondingly shaped socket 119 in the reel 108. A collar 120 secured to the shaft 116 has interposed between it and one of the standards 109 a spiral spring 121 which forces the head 117 against the reel 108. On pushing back the head 117 the reel 108 may be slipped off its shaft 113 when desired.

From the foregoing description it will readily be seen that when any one of the keys is depressed to produce upon the staff of lamps the character called for by the letter of the key in operation the same electric current employed in lighting the lamps will cause to be automatically and simultaneously printed upon a tape the letter or numeral of the key depressed and the lever attached to the key in operation will simultaneously and automatically cause the tape and ink-ribbon to be properly fed and the tape printed upon to be wound upon the receiving reel by the interposed mechanism hereinbefore described.

The object of winding the printed tape upon a reel within the casing, which can be readily removed for inspection when desired, is to preserve an accurate record of all signals flashed from the staff, in order that any disputes which may arise can be settled beyond question. For this purpose it is my intention to employ a door in the side of the casing adjacent to the removable receiving reel such door to be sealed and opened only by persons other than the officials of the vessel.

I claim—

1. A signal telegraph consisting essentially of a number of electric lamps arranged in a continuous line, a number of keys arranged upon a casing, each key being designated by a letter of the alphabet or a numeral and electrically connected with the necessary lamps to form the dots and dashes called for by the letter or numeral of the key in operation and a printing mechanism electrically connected therewith which automatically and simultaneously records each letter or numeral displayed upon the staff of lamps.

2. A signal telegraph consisting essentially of a number of electric lamps arranged in a continuous line a number of keys arranged upon a casing, each key being designated by a letter of the alphabet or a numeral and electrically connected with the necessary lamps, to form the dots and dashes called for by the letter or numeral of the key in operation a printing mechanism electrically connected therewith which automatically and simultaneously records each letter or numeral displayed upon the staff of lamps and mechanism connected with the keys for automatically feeding the ink-ribbon and tape.

3. A signal telegraph consisting essentially of a number of electric lamps arranged in a continuous line a number of keys arranged upon a casing, each key being designated by a letter of the alphabet or a numeral and electrically connected with the necessary lamps to form the dots and dashes called for by the letter or numeral of the key in operation a printing mechanism electrically connected therewith which automatically and simultaneously records each letter or numeral displayed upon the staff of lamps and mechanism connected with the keys for automatically feeding the ink-ribbon and tape and winding the printed tape upon its removable reel.

4. A signal telegraph consisting essentially of a number of electric lamps arranged in a continuous line, a number of keys arranged upon a casing, each key being designated by a letter of the alphabet or a numeral and electrically connected with the necessary lamps to form the dots and dashes called for by the letter or numeral of the key in operation, a printing mechanism electrically connected therewith which automatically and simultaneously records each letter or numeral displayed upon the staff of lamps and mechanism connected with the keys for automatically feeding the ink-ribbon and tape and winding the printed tape upon a reel, such reel being sealed within the casing substantially as and for the purpose stated.

5. A signal telegraph consisting essentially of a number of electric lamps arranged in a continuous line, a bed-plate of non-conducting material, a series of metal strips insulated from each other in such bed-plate and each electrically connected with a separate lamp contacting plates each operated by a separate key to complete the circuit through different groups of the metal strips to light the lamps necessary to produce the character desired and a printing mechanism electrically connected therewith which automatically and simultaneously records each letter or numeral displayed upon the staff of lamps.

6. A signal telegraph consisting essentially of a number of electric lamps arranged in a continuous line, a bed-plate of non-conducting material, a series of metal strips insulated from each other in such bed plate and each electrically connected with a separate lamp, contacting plates each operated by a separate key to complete the circuit through different groups of the metal strips to light the lamps necessary to produce the character desired, a printing mechanism electrically connected therewith which automatically and simultaneously records each letter or numeral displayed upon the staff of lamps and mechanism connected with the keys for automatically feeding the ink-ribbon and tape.

7. A signal telegraph consisting essentially of a number of electric lamps arranged in a continuous line, a bed-plate of non-conducting material, a series of metal strips insulated from each other in such bed-plate and each electrically connected with a separate lamp, contacting plates each operated by a separate key to complete the circuit through different groups of the metal strips to light the lamps necessary to produce the character desired, a printing mechanism electrically connected therewith which automatically and simultaneously records each letter or numeral displayed upon the staff of lamps and mechanism connected with the keys for automatically feeding the ink-ribbon and tape and winding the printed tape upon its removable reel.

8. A signal telegraph consisting essentially of a number of electric lamps arranged in a continuous line, a bed-plate of non-conducting material, a series of metal strips insulated from each other in such bed-plate and each electrically connected with a separate lamp contacting plates each operated by a separate key to complete the circuit through different groups of the metal strips to light the lamps necessary to produce the character desired, a printing mechanism electrically connected therewith which automatically and simultaneously records each letter or numeral displayed upon the staff of lamps and mechanism connected with the keys for automatically feeding the ink-ribbon and tape and winding the printed tape upon a removable reel, such reel being sealed within the casing substantially as and for the purpose stated.

9. A signal telegraph consisting essentially of a number of electric lamps arranged in a continuous line, a number of keys arranged upon a casing, each key being designated by a letter of the alphabet or a numeral and electrically connected with the necessary lamps to form the dots and dashes called for by the letter or numeral of the key in operation and mechanism arranged within the casing and acting in conjunction with the key in operation to automatically lock all the other keys substantially as and for the purpose stated.

10. A signal telegraph consisting essentially of a number of electric lamps arranged in a continuous line, a bed-plate of non-conducting material, a series of metal strips insulated from each other in such bed-plate and each electrically connected with a separate lamp, contacting plates each operated by a separate key to complete the circuit through different groups of the metal strips to light the lamps necessary to produce the character desired and mechanism arranged within the casing and acting in conjunction with the key in operation to automatically lock all the other keys substantially as and for the purpose stated.

11. In a signal telegraph substantially as shown the combination with the keys movably mounted in the casing and electrically connected with the lights in the staff of an adjustable index-frame consisting of a number of rods journaled in bearings each rod having a ratchet wheel engaging with a common rack bar and a thumb-wheel upon one of the rods for revolving the series uniformly in the same direction, and blocks upon the rods for each key, upon the four faces of which are placed the letters of the alphabet and the numerals so arranged that on turning the rods a quarter, half or three quarters revolution, the relative positions of the letters brought into view are changed as many times to form ciphers substantially as and for the purpose stated.

12. In a signal telegraph substantially as described, the combination with contacting plates operated by separate keys of the spring-pressed metal strips insulated from each other in a non-conducting bed-plate and projecting alternately from opposite sides of the bed-plate, the alternate projecting ends on each side being loosely connected by short wires to rows of binding-posts secured in the bed-plate and elevated strips on both sides beyond and over the rows of binding-posts upon the bed-plate, the elevated strips having metal rods extending horizontally through the same, the inner ends forming rows of binding-posts wired to the rows of binding posts upon the bed-plate and the outer ends forming rows of binding-posts connected separately to the lamps in the staff substantially as shown and described.

13. In a signal telegraph the combination with the levers 19 operated by the keys 27. 28 and carrying the contacting plates 32, of the spring strips 58 mounted upon the insulated posts 54, the magnets 61 separately connected by wires to the spring-strips 58 the armatures 69 adapted for contact with the magnets 61 and the letter bars 66 loosely hung to the armatures 69 by the loops 70 and adapted to be forced up against the ink-ribbon and tape to print upon the tape the letter of the key in operation substantially as shown and described.

14. In a signal telegraph the combination with the levers 19 having hooked projections 76, of the rock-shaft 78 with transverse ledge 79, the rocker-arm 81 connecting rod 82 rocker arm 83 upon the shaft 84, the angular rocker arm 89 upon shaft 84 carrying the pivoted pawl for engagement with the ratchet wheel 87 for actuating the ink-ribbon reel 86, the weighted pawl 91 pivoted to the rocker-arm 89 adapted for engagement with the ratchet-wheel 92 for actuating the drum 95, the spring-pressed friction roller 98, the elastic roller 75, the ink-ribbon reel 103 and the guides 106 and 107, the whole arranged to automatically feed the ink-ribbon and tape from the outside reel 104 substantially as shown and described.

15. In a signal telegraph the combination with the levers 19 having hooked projections 76, of the rock-shaft 78 with transverse ledge 79, the rocker-arm 110, the rod 111 loosely connecting the rocker-arm 110 with the rocker-arm 112 upon the shaft 113, the pawl 114 pivoted to the rocker-arm 112 engaging with the ratchet-wheel 115 for actuating the tape-receiving reel 108 mounted upon shaft 113 all arranged and operating substantially as shown and described.

16. In a signal telegraph the combination with the levers 19 having hooked projections 76, of the rock-shaft 78 with transverse ledge 79, the rocker-arm 110, the rod 111 loosely connecting the rocker-arm 110 with the rocker-arm 112 upon the shaft 113, the pawl 114 pivoted to the rocker-arm 112 engaging with the ratchet-wheel 115 for actuating the tape-receiving reel 108 removably mounted upon the shaft 113 and held in place thereon by the spring-pressed rod 116 with head 117 all arranged and operating substantially as shown and described.

17. In a signal telegraph the combination with the levers 19 carrying the contacting plates 32 and operating keys 27. 28, of the spring-pressed pins 24 having heads 25 and adapted for vertical play in the sockets 23 in the wall 20 and sockets 30 in the bed-plate and the horizontal recess 29 in the wall 20 containing the balls 31 all arranged and operating substantially as and for the purpose stated.

18. In a signal telegraph a staff of lamps consisting of a narrow longitudinal chamber for the reception of the wires leading to the lamps a series of short transverse chambers for the reception of the lamps and electric lamps secured in such chambers and wired to the key-board substantially as shown and described.

In testimony whereof I have signed my name to this specification in the presence of two subscribing witnesses.

CLAUDIUS V. BOUGHTON.

Witnesses:
O. E. HODDICK,
W. T. MILLER.